(12) United States Patent
Joseph

(10) Patent No.: US 6,450,488 B1
(45) Date of Patent: Sep. 17, 2002

(54) ISOLATOR PAD FOR A MOTOR VEHICLE LEAF SPRING

(75) Inventor: Gerald Michael Joseph, Woodcliff Lake, NJ (US)

(73) Assignee: Research & Manufacturing Corp., Jersey City, NJ (US)

( * ) Notice: Subject to any disclaimer, the term of this patent is extended or adjusted under 35 U.S.C. 154(b) by 0 days.

(21) Appl. No.: 09/479,293

(22) Filed: Jan. 6, 2000

(51) Int. Cl.⁷ .................................................. F16E 1/30
(52) U.S. Cl. ........................ 267/269; 267/260; 267/152
(58) Field of Search ................................. 267/105, 239, 267/27, 29, 30, 32, 46, 260, 269, 141, 36.1, 152, 153

(56) References Cited

U.S. PATENT DOCUMENTS

| | | | | | |
|---|---|---|---|---|---|
| 1,265,623 | A | * | 5/1918 | Currey | 267/260 |
| 2,054,305 | A | * | 9/1936 | Stilwell | 267/269 |
| 2,284,646 | A | * | 6/1942 | Eidal | 267/30 |
| 2,650,089 | A | * | 8/1953 | Martin | 261/114.2 |
| 2,991,993 | A | * | 7/1961 | Harbers et al. | 267/259 |
| 3,026,224 | A | * | 3/1962 | Rogers, Jr. | 181/201 |
| 3,049,344 | A | * | 8/1962 | Hawkins | 206/589 |
| 3,093,367 | A | * | 6/1963 | Hawkins et al. | 188/268 |
| 4,565,356 | A | * | 1/1986 | Nickel | 267/54 R |
| 5,887,881 | A | * | 3/1999 | Hatch | 280/124.175 |

FOREIGN PATENT DOCUMENTS

JP             360229813 A    * 11/1985

* cited by examiner

*Primary Examiner*—Christopher P. Schwartz
*Assistant Examiner*—Xuan Lan Nguyen
(74) *Attorney, Agent, or Firm*—Duane Morris LLP

(57) ABSTRACT

A plastic isolator pad having a top wall and opposing side walls depending from the top wall. The isolator pad is typically used for supporting an outboard end of a leaf spring. The isolator pad typically includes a plurality of webs which extend from a bottom surface of the top wall and a plurality of stiffeners which extend between the webs. Also usually provided are opposing ear-like projections which extend laterally from the top wall.

17 Claims, 4 Drawing Sheets

ISOLATOR PAD FOR A MOTOR VEHICLE LEAF SPRING

FIELD OF THE INVENTION

The present invention relates to isolator pads for motor vehicle leaf springs, and more particularly, to a plastic isolator pad for supporting the outboard ends of a transverse mounted composite mono-leaf spring.

BACKGROUND OF THE INVENTION

Composite leaf springs offer both weight and space savings over conventional coil and metal leaf spring designs used in motor vehicle suspension systems although, the most significant advantage of the composite spring is in the reduction of weight. In most applications, at least a 60% weight reduction is realized. Additionally, laboratory fatigue tests have shown that composite leaf springs are up to five times more durable than conventional multi-leaf steel springs. Down time due to spring problems is virtually eliminated with composite leaf springs.

One of the more popular composite leaf spring designs is manufactured by the Inland Division of General Motors Corporation (GM). This monoleaf spring design is made from a composite glass fiber/epoxy resin which is formed and cured to provide sufficient strength and flexibility to suspend a motor vehicle. GM has employed such springs in the suspension systems of many of their automobile lines. One particular application of this spring is in the independent rear suspension system of GM's W-body automobile line produced between 1988 and 1997. In this application, a single composite monoleaf spring is mounted transverse to the vehicle's frame beneath a rear suspension cross member and supports at each of its outboard ends the lower end of a rear wheel spindle. Each spindle is pivotally connected to the rear suspension cross member by parallel spindle rods. The composite spring is mounted to the suspension cross member at two points spaced along the spring length. To isolate suspension loads, each outboard end of the composite spring rests on a rubber pad or isolator disposed in a pocket area of the corresponding wheel spindle.

Rubber spring isolator devices are generally satisfactory when the vehicle is new, however, over time the isolators wear out, tear, and eventually fall out of the pocket areas of the wheel spindles. As a result, noise occurs as the suspension pivots up and down to permit the rear wheels of the vehicle to absorb bumps and other imperfections in the road surface. This noise is caused by the outboard ends of the spring contacting the metal areas of the spindle pocket area. This spring-to-metal contact can crack and break the spring. Moreover, severe deterioration or loss of the rubber isolators can cause a lowering of the rear suspension height which in turn can result in bending and breakage of the spindle rods.

Accordingly, a need exist for a more durable isolator for the outboard ends of transverse mounted leaf springs.

SUMMARY OF THE INVENTION

A plastic isolator pad comprising a top wall and opposing side walls depending from the top wall. The isolator pad is typically used for supporting an outboard end of a leaf spring.

One aspect of the invention includes a plurality of webs which extend from a bottom surface of the top wall.

Another aspect of invention includes a plurality of stiffeners which extend between the webs.

Still another aspect of the invention includes opposing ear-like projections which extend laterally from the top wall.

A further aspect of the invention includes a motor vehicle wheel suspension, comprising a vehicle frame, a leaf spring arranged transverse to the vehicle frame, a wheel spindle pivotally connected to the vehicle frame, the spring supporting at an outboard end thereof the spindle, and a plastic isolator pad mounted on a portion of the spindle, the outboard end of the spring resting on the isolator pad.

BRIEF DESCRIPTION OF THE DRAWINGS

The advantages, nature, and various additional features of the invention will appear more fully upon consideration of the illustrative embodiment now to be described in detail in connection with accompanying drawings wherein.

It should be understood that the drawings are for purposes of illustrating the concepts of the invention and are not to scale.

DETAILED DESCRIPTION OF THE INVENTION

Figure 1A:
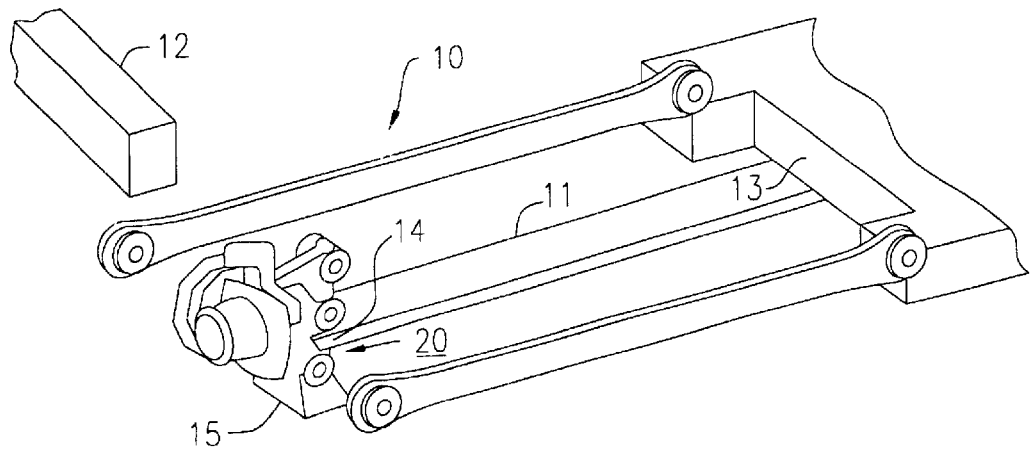
FIG. 1A is a perspective view a conventional motor vehicle rear wheel suspension employing a spring isolator according to an embodiment of the invention, with some components shown exploded.
Figure 1B:
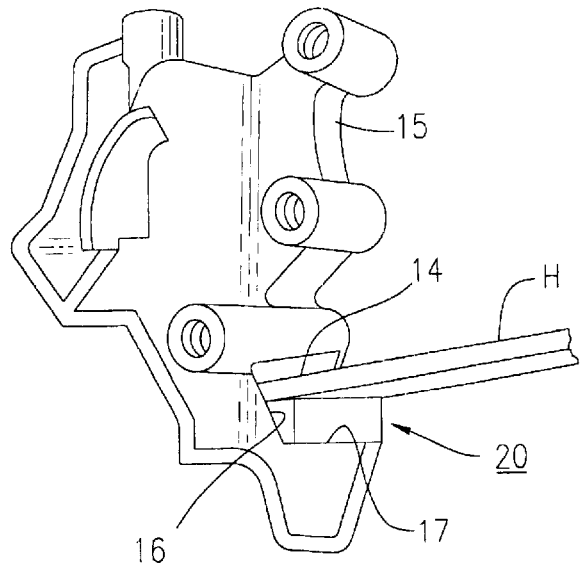
FIG. 1B is a perspective view of the spindle of the suspension of FIG. 1A, which shows the location of the isolator of the invention.

FIGS. 1A and 1B collectively show a spring isolator pad 20 (isolator 20) according to an embodiment of the invention as typically employed in a conventional motor vehicle rear wheel suspension 10 such as GM's W-body automobile line produced between 1988 and 1997. The suspension 10 (only one side of the suspension is shown) comprises a composite mono-leaf spring 11 that is arranged transverse to the vehicle frame 12 beneath a rear suspension cross member 13. The spring 11 supports at each of its outboard ends 14 the lower end of a rear wheel spindle 15. The spindle 15 is pivotally connected by front and rear spindle rods to the cross member 13 of the vehicle frame 12. The composite spring 11 is mounted to the cross member 13 at two points spaced along the spring's length.

The wheel spindle 15 includes a pocket area 16 for receiving the outboard end 14 of the composite spring 11. The pocket area 16 defines a spring perch 17 on which the outboard end 14 of the composite spring 11 rests. The isolator 20 of the invention is mounted on the spring perch 17 beneath the outboard end 14 of the spring 11.

Figure 2:
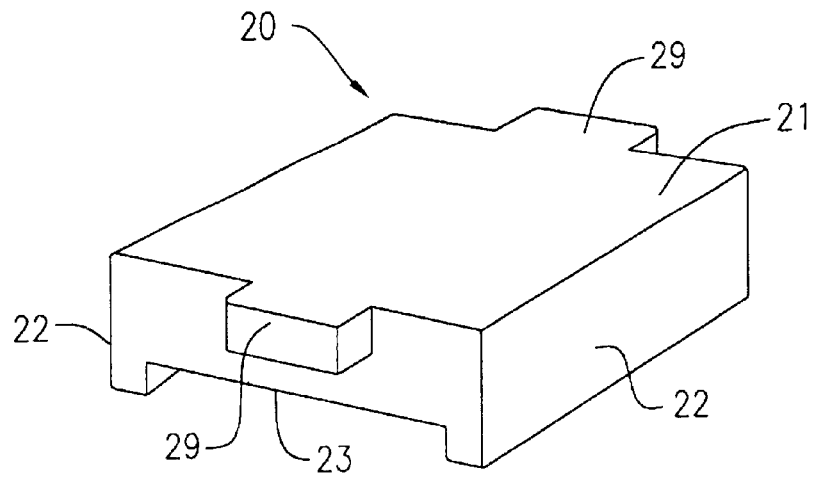
FIG. 2 is a perspective view of the isolator of the invention shown separate from the suspension of FIGS. 1A and 1B.
Figure 3:
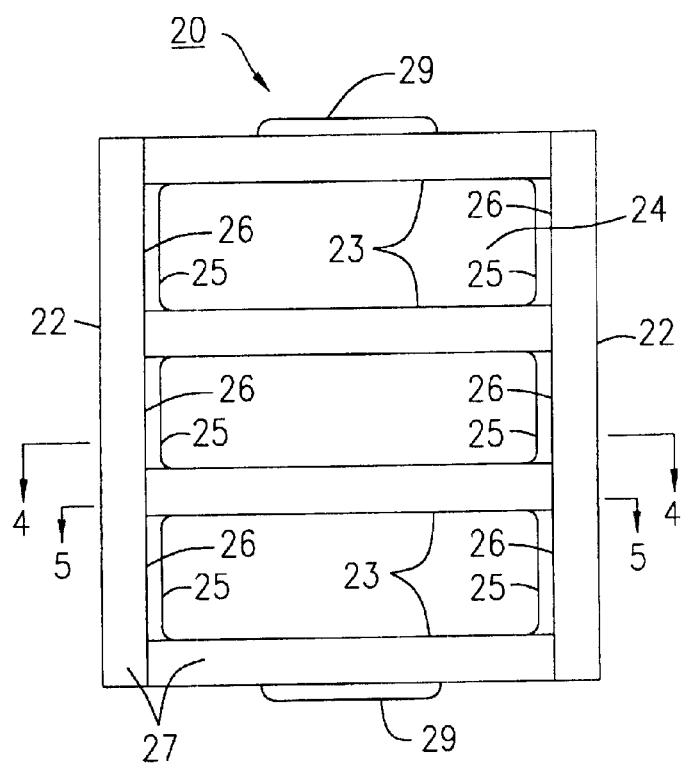
FIG. 3 is bottom plan view of the isolator of FIG. 2
Figure 4:
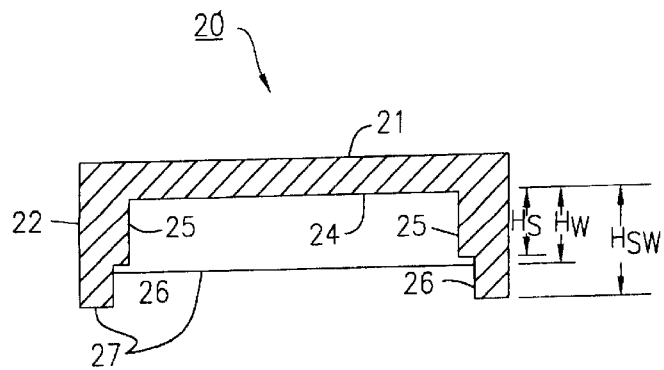
FIG. 4 is a cross-sectional end view through line 4—4 of FIG. 3.
Figure 5:
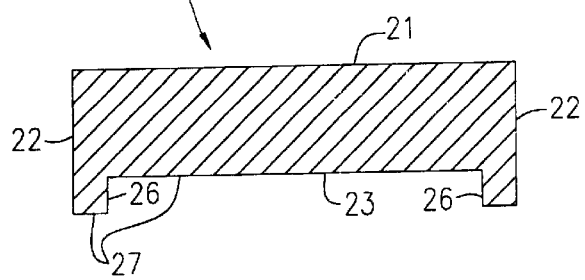
FIG. 5 is a cross-section end view through line 5—5 of FIG. 3.

FIGS. 2–4 show the details of the isolator 20 of the invention. The isolator 20 is generally rectangular in shape and comprises a substantially planar top wall 21 with two opposing side walls 22 depending therefrom. A plurality of spaced-apart reinforcing webs 23 extend down from the bottom surface 24 of the top wall 21, connecting the side walls 22 together. A plurality of stiffeners 25 extending laterally from the inner surfaces 26 of the side walls 22, connecting the reinforcing webs together 23. The webs 23 and the stiffeners 25 rigidify the top and side walls 21,22 of the isolator 20 so that it can support the outboard end 14 of the composite spring 11. Although not shown, additional stiffeners can be provided between the webs. Opposing ear-like projections 29 extend laterally beyond the two outermost webs 23 from the top wall 21.

As can be seen in FIG. 4, the webs 23 each have a height $H_W$ which is less than the height $H_{SW}$ of the side walls 22. The stiffeners 25 have a height $H_S$ which is less than the height $H_W$ of the webs 23. The height differential between the side walls 22 and the webs 23 creates a grid-like stepped spindle seating surface 27.

Figure 6:
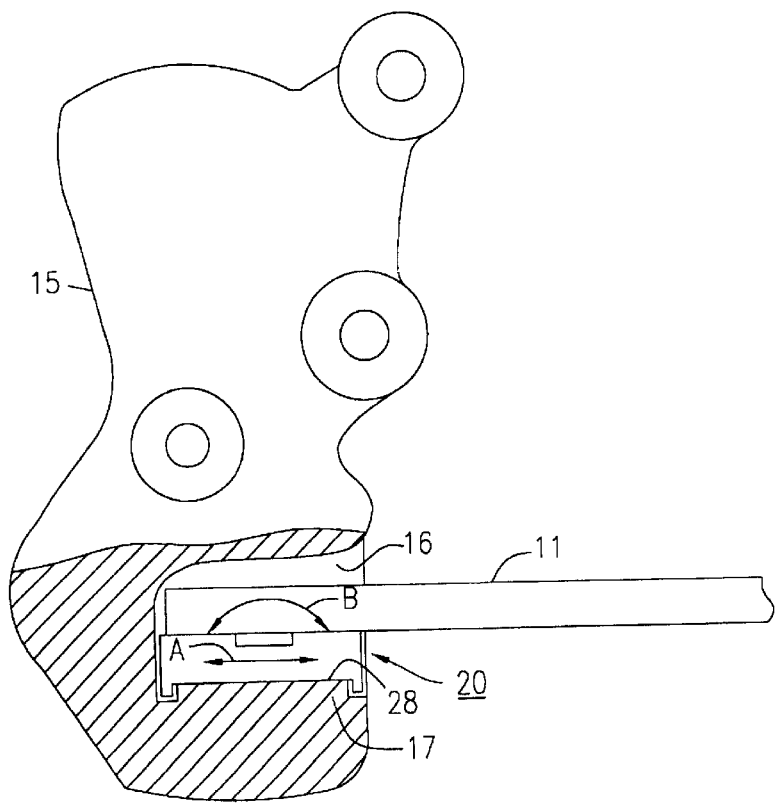
FIGS. 6 and 7 are respective side and rear elevational views of the spindle shown in partial section that illustrate how the isolator is positioned in the spindle.
Figure 7:
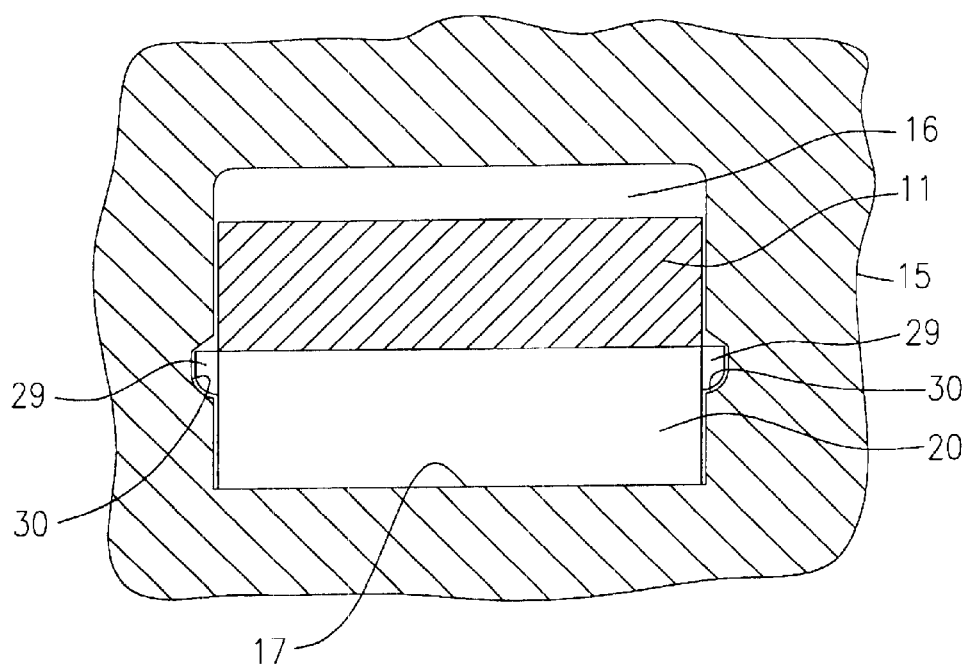

As shown in FIG. 6, the stepped seating surface 27 permits the isolator 20 to be securely mounted on the stepped surface 28 of the spring perch 17, hence preventing lateral movement in the direction of arrow A which could lead to the isolator 20 slipping out of the pocket area 16 of the spindle 15. The ear-like projections 29 on the isolator are disposed in grooves 30 formed in the pocket area 16 of the spindle 15 (FIG. 7). The projections 29 cooperate with the grooves 30 to prevent the upper portion of the isolator 20 from rocking in the direction of arrow B thus, further preventing the isolator 20 from slipping and falling out of the pocket area 16 of the spindle 15. One of ordinary skill in the art will of course recognize that the seating surface 27 of the isolator 20 of the invention can also be adapted for use in other leaf-spring applications.

The isolator 20 of the invention is fabricated as a single unitary member from a plastic material, such as polypropylene using conventional plastic molding techniques. The plastic construction provides many advantages over conventional rubber isolators. The plastic construction of the isolator 20 of the invention makes it more durable than rubber isolators and therefore, less prone to wear. Moreover, the plastic construction helps to prevent the isolator 20 of the invention from tearing like rubber isolators. Since the isolator 20 of the invention is less likely to wear and/or tear, the probability of the isolator 20 falling out of the pocket area 16 of a wheel spindle 15 is substantially reduced. The stepped seating surface 27 and the ear-like projections 29 further reduce the probability of the isolator 20 falling out of the pocket area 16 of the wheel spindle 15.

As a result, noise which is caused by the outboard ends 14 of the spring 11 contacting the metal areas of the spindle pocket area 16 is substantially eliminated. Additionally, the incidence of spring cracks and breakage is substantially reduced because spring-to-metal contact caused by the isolator falling out of the spindle pocket area 16 is virtually eliminated. Further, because the isolator of the invention is less prone to wear, suspension height is maintained which in turn reduces or eliminates bending and breakage of the spindle rods.

While the foregoing invention has been described with reference to the above embodiment, various modifications and changes can be made without departing from the spirit of the invention. Accordingly, all such modifications and changes are considered to be within the scope of the appended claims.

What is claimed is:

1. A plastic isolator pad for supporting an outboard end of a leaf spring, the isolator pad comprising:
   a top wall defining a top surface for supporting the outboard end of the leaf spring;
   opposing side walls depending from the top wall.
   opposing ear-like projections extending laterally from the top wall.

2. The plastic isolator pad according to claim 1, further comprising a plurality of webs extending from a bottom surface of the top wall.

3. The plastic isolator pad according to claim 2, further comprising a plurality of stiffeners extending between the webs.

4. The plastic isolator pad according to claim 1, further comprising a plurality of stiffeners extending from inner surfaces of the side walls.

5. The plastic isolator pad according to claim 1, wherein the spring comprises a composite mono-leaf spring.

6. A plastic isolator pad for supporting an outboard end of a leaf spring, the isolator pad comprising:
   a top wall defining a top surface for supporting the outboard end of the leaf spring;
   opposing side walls depending from the top wall and being of a first height, and
   a plurality of webs extending from a bottom surface of the top wall, the webs connecting the side walls together, the webs being of a second height which is less than the first height of the side walls.

7. A plastic isolator pad for supporting an outboard end of a leaf spring, the isolator pad comprising:
   a top wall defining a top surface for supporting the outboard end of the leaf spring;
   opposing side walls depending from the top wall; and
   a plurality of webs extending from a bottom surface of the top wall, the webs connecting the side walls together.

8. The plastic isolator pad according to claim 7, wherein the stiffeners extend from inner surfaces of the side walls.

9. The plastic isolator pad according to claim 6, further comprising opposing ear-like projections extending laterally from the top wall.

10. The plastic isolator pad according to claim 6, wherein the spring comprises a composite mono-leaf spring.

11. A motor vehicle wheel suspension, comprising:
    a vehicle frame;
    a leaf spring arranged transverse to the vehicle frame;
    a wheel spindle pivotally connected to the vehicle frame, the spring having an outboard end that applies a biasing force to the spindle; and
    a plastic isolator pad mounted on a portion of the spindle, the outboard end of the spring resting on the isolator pad opposing ear-like projections extending laterally from the top wall.

12. The suspension according to claim 11, wherein the spring comprises a composite mono-leaf spring.

13. The suspension according to claim 11, wherein the isolator pad includes a top wall and opposing side walls depending from the top wall.

14. The suspension according to claim 11, wherein the isolator pad further includes a plurality of webs extending from a bottom surface of the top wall.

15. The suspension according to claim 15, wherein the isolator pad further includes a plurality of stiffeners extending between the webs.

16. The suspension according to claim 16, wherein the stiffeners extend from inner surfaces of the side walls.

17. The suspension according to claim 11, wherein the isolator pad further includes a plurality of stiffeners extending from inner surfaces of the side walls.

* * * * *